(12) United States Patent
Nishida

(10) Patent No.: US 6,871,963 B2
(45) Date of Patent: Mar. 29, 2005

(54) PROJECTOR

(75) Inventor: Kazuhiro Nishida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/951,610

(22) Filed: Sep. 14, 2001

(65) Prior Publication Data

US 2002/0036754 A1 Mar. 28, 2002

(30) Foreign Application Priority Data

Sep. 20, 2000 (JP) .......................... 2000-285055

(51) Int. Cl.[7] .......................... G03B 3/00; G03B 21/14; G03B 21/00
(52) U.S. Cl. .......................... 353/101; 353/31; 353/100; 353/69
(58) Field of Search .............................. 353/30, 31, 33, 353/34, 69, 100, 101, 121, 119, 32, 35, 37; 349/5, 8, 57, 58, 62

(56) References Cited

U.S. PATENT DOCUMENTS

| | | | | |
|---|---|---|---|---|
| 4,943,154 A | * | 7/1990 | Miyatake et al. | 348/751 |
| 5,649,753 A | * | 7/1997 | Masumoto | 353/102 |
| 5,860,721 A | * | 1/1999 | Bowron et al. | 353/101 |
| 5,865,521 A | * | 2/1999 | Hashizume et al. | 353/38 |
| 5,978,136 A | * | 11/1999 | Ogawa et al. | 359/487 |
| 5,986,809 A | * | 11/1999 | Itoh et al. | 359/618 |
| 6,092,901 A | * | 7/2000 | Hashizume et al. | 362/19 |
| 6,183,094 B1 | * | 2/2001 | Ohta | 353/38 |

FOREIGN PATENT DOCUMENTS

| | | |
|---|---|---|
| JP | U 07-005119 | 1/1995 |
| JP | 2000-121997 | 4/2000 |

OTHER PUBLICATIONS

Hecht, Eugene, Optics, 1998, Addison Wesley Longman, 3rd edition, p. 392.*

* cited by examiner

Primary Examiner—Judy Nguyen
Assistant Examiner—Andrew Sever
(74) Attorney, Agent, or Firm—Oliff & Berridge, PLC

(57) ABSTRACT

The invention makes it easier to perform adjustments for bringing into conformity an illuminating area of an illuminating color light beam. A projector in accordance with the invention includes an illumination optical system; a color light separation optical system that separates illumination light into illumination light beams of a plurality of colors; a plurality of electro-optical devices that convert the illumination light beams of a plurality of colors into light beams of a plurality of colors; a color light synthesizing optical system that synthesizes the converted light beams of a plurality of colors that exit from the plurality of electro-optical devices; a projection optical system that projects the color image that is represented by the synthesized light beam; and a relay optical system that is provided in a path of at least one color illumination light beam. The relay optical system includes an adjusting device that adjusts the location of at least one of a plurality of lenses of the relay optical system in an optical axis direction.

8 Claims, 4 Drawing Sheets

A B C
310   330   350  400B

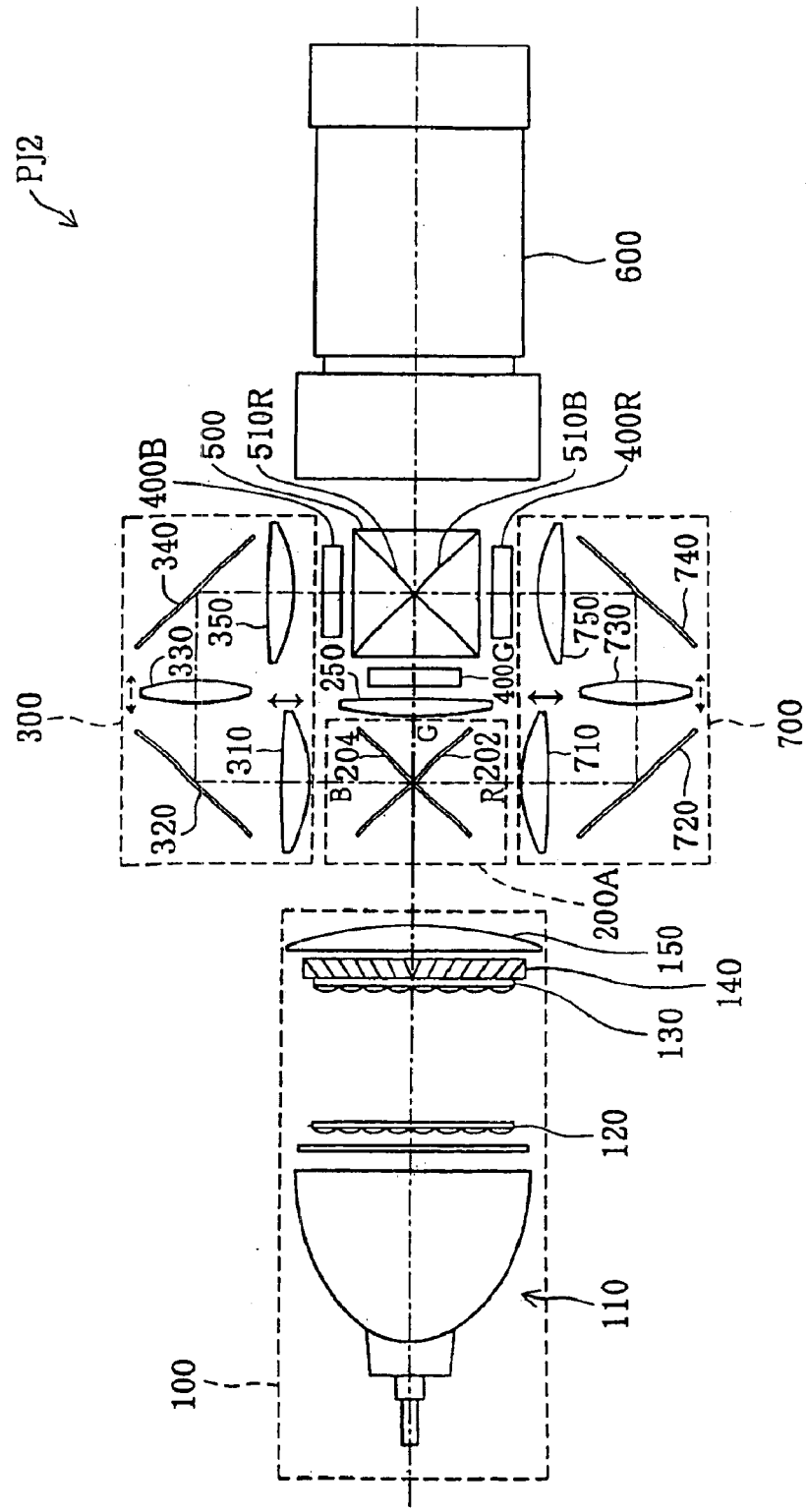

PROJECTOR

BACKGROUND OF THE INVENTION

1. Field of Invention

The present invention relates to a projector that projects an image.

2. Description of Related Art

In general, a projector that projects a color image includes an illumination optical system that causes illumination light to exit therefrom, a color light separation optical system that separates the illumination light into three color illumination light beams, three light valves that convert (modulate) the three color illumination light beams into light beams that correspond to color signals that correspond to the three color illumination light beams, respectively, a color light synthesizing optical system for synthesizing the converted (modulated) three color light beams that exit from the three light valves, and a projection optical system that projects an image that is represented by the synthesized light beam that exits from the color light synthesizing optical system. Electro-optical devices, such as liquid crystal panels, are used as the light valves. Hereafter, a projector including three light valves for three colors is referred to as a three-plate-type projector.

It is preferable for an image that is projected by a projector to be bright, and desirable for the illumination light beams to efficiently illuminate light-incident surfaces of the light valves. Therefore, conventional projectors exist that adjust the size of illuminating areas of the illumination light beams by adjusting the projection magnification of the illumination light that exits from the illumination optical system.

SUMMARY OF THE INVENTION

However, conventional projectors have a problem in that the size of the illuminating area of each of the separated corresponding color light beams vary in common, so that the size of each illuminating area cannot be adjusted in accordance with each of the color illumination light beams. In particular, in three-plate-type projectors, of the paths of the illumination light beams extending from the illumination optical system to the corresponding color light valves, a path exists that is longer than the other paths. A relay optical system is often provided in this long path so that, compared to the other paths, many structural elements of the optical system that greatly affect the size of the corresponding illuminating area are provided. Therefore, it is advantageous to provide a technology that enables easy adjustment to bring into conformity the illuminating area of the color illumination light beam that passes through the path where the relay optical system is provided and the illuminating areas of the other color illumination light beams.

It is an object of the invention to address aforementioned problem that exists in the conventional technology, and to provide a technology that enables easy adjustment to bring into conformity an illuminating area of a color illumination light beam that passes a relay optical system and illuminating areas of the other color illumination light beams.

In order to overcome at least part of the above-described problem, according to the present invention, a projector is provided that projects an image and that includes an illumination optical system; a color light separation optical system that separates illumination light that has exited from the illumination optical system into illumination light beams of a plurality of colors; a plurality of electro-optical devices that convert the illumination light beams of a plurality of colors into light beams that correspond to color signals that correspond to the respective illumination light beams of a plurality of colors; a color light synthesizing optical system that synthesizes the converted light beams of a plurality of colors that exit from the plurality of electro-optical devices in order to cause a light beam that represents a color image to exit therefrom; a projection optical system that projects the color image that is represented by the synthesized light beam that exits from the color light synthesizing optical system; and a relay optical system that is provided in a path of at least one color illumination light beam of the illumination light beams of a plurality of colors that have exited from the color light separation optical system. The relay optical system includes an adjusting device that adjusts the location of at least one of a plurality of lenses of the relay optical system in an optical axis direction.

According to the projector of the present invention, since the location of at least one of the lenses of the relay optical system along the optical axis direction can be adjusted, the size of an illuminating area of the illumination light that passes through the relay optical system can be adjusted independently of the adjustments of the sizes of illuminating areas of the other color illumination light beams. Therefore, adjustments to bring into conformity the illuminating area of the color illumination light that passes through the relay optical system and the illuminating areas of the other color illumination light beams can be easily performed. In the specification, the phrase "bringing into conformity the illuminating areas" is to adjust the relationship between each of the color illuminating areas so as to increase the quality of the color image that is projected.

The structure may be such that the color light separation optical system separates the illumination light that has exited from the illumination optical system into three color illumination light beams. Relay optical systems are provided in corresponding paths of two of the three color illumination light beams that have exited from the color light separation optical system. Each relay optical system includes an adjusting device that adjusts the location of at least one of a plurality of lenses of its corresponding relay optical system in an optical axis direction.

When this is achieved, the sizes of the illuminating areas of two of the three illuminating light beams can be independently adjusted. Therefore, when the size of the illuminating area of the remaining one color illumination light beam is previously properly set, the sizes of the illuminating areas of the corresponding three color illumination light beams can be properly set. Consequently, it is possible to even more easily make adjustments to bring the illuminating areas of the three color illumination light beams into conformity with each other.

Here, it is preferable that at least one of the lenses be a relay lens.

When this is achieved, it is possible to adjust the size of an illuminating area, or the sizes of illuminating areas, without significantly changing the incident angle of a color light beam that illuminates its corresponding electro-optical device, or the incident angles of color light beams that illuminate corresponding electro-optical devices.

In addition, it is preferable that the adjusting device, or adjusting devices, be capable of adjusting the location or locations in biaxial directions that are perpendicular to each other and the corresponding optical axis direction.

When this is achieved, it is possible to adjust the location of an illuminating area, or the locations of illumination areas, in biaxial directions that are perpendicular to each other and the corresponding optical axis direction.

BRIEF DESCRIPTION OF THE DRAWINGS

FIG. 4 is a schematic plan view of the main portion of optical systems of a second embodiment of a projector in accordance with the present invention.

DETAILED DESCRIPTION OF PREFERRED EMBODIMENTS

Hereafter, a description of embodiments of the present invention will be given.

Figure 1:
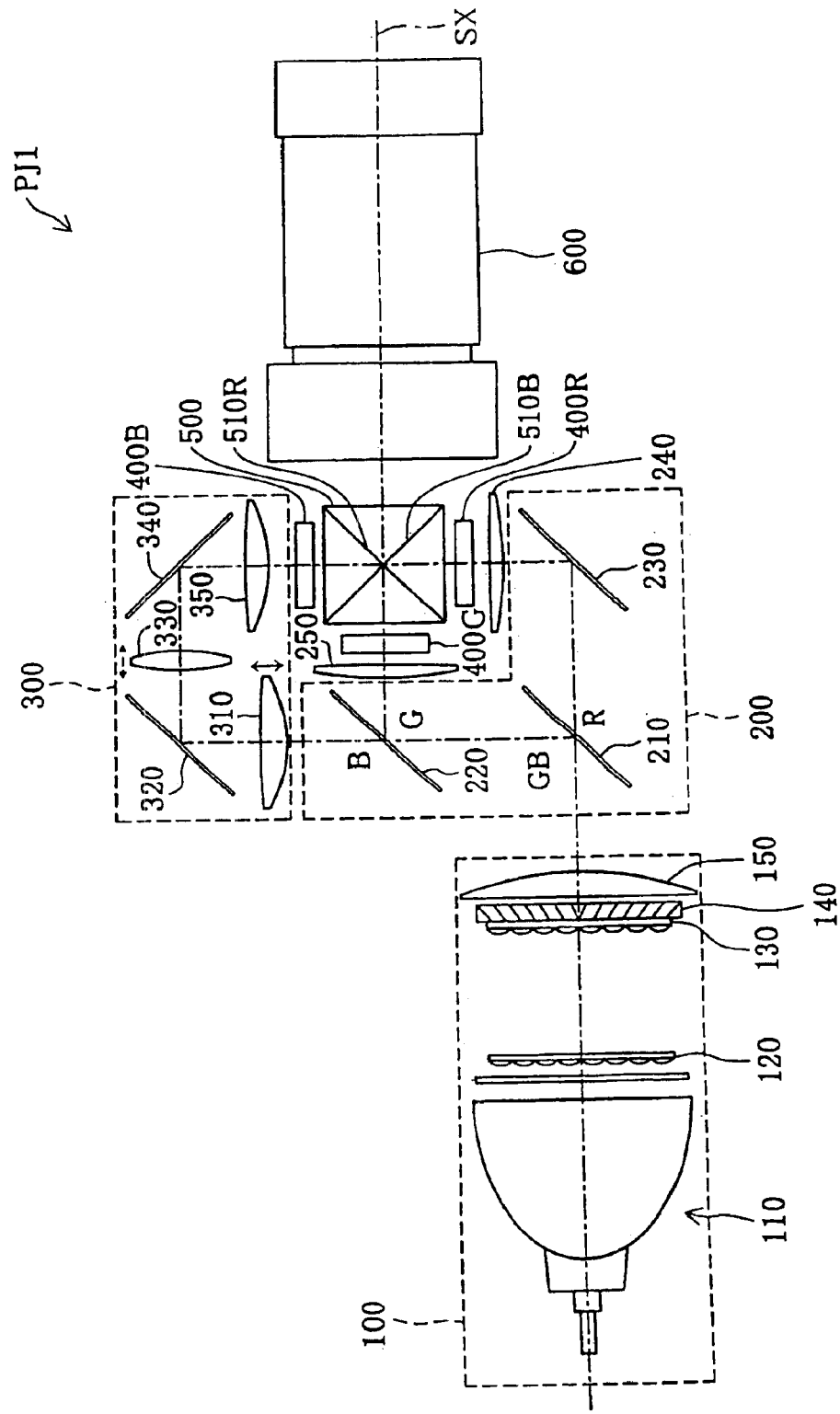
FIG. 1 is a schematic plan view of the main portion of optical systems of a first embodiment of a projector in accordance with the present invention.

A. First Embodiment:

FIG. 1 is a schematic plan view of the main portion of optical systems of a projector of a first embodiment of the present invention. A projector PJ1 includes an illumination optical system 100, a color light separation optical system 200, a relay optical system 300, three light valves 400R, 400G, and 400B, a cross dichroic prism 500, and a projection lens 600. The structural elements of each optical system are disposed in a substantially horizontal direction, with the cross dichroic prism 500 as a center.

The illumination optical system 100 includes a light source 110, a first lens array 120, a second lens array 130, a polarization conversion element 140, and a superimposing lens 150. A light beam that has exited from the light source 110 is divided into a plurality of sub-beams by the first lens array 120. The sub-beams are each superimposed on light-incident surfaces of the three light valves 400R, 400G, and 400B, which are to be illuminated through the second lens array 130 and the superimposing lens 150. That is, the first lens array 120, the second lens array 130, and the superimposing lens 150 form an integrator illumination optical system that almost uniformly illuminate the three light valves 400R, 400G, and 400B, which are to be illuminated. The polarization conversion element 140 functions to convert unpolarized light beam into polarized light beam that have one polarization direction that is usable at the three light valves 400R, 400G, and 400B.

The illumination optical system 100 may be provided with a reflective mirror in accordance with the way each of the structural elements of the illumination optical system 100 is disposed.

The illumination optical system is not limited to the illumination optical system 100 discussed above in the embodiment, and any structure may be used as long as the illumination optical system can illuminate the three light valves 400R, 400G, and 400B.

The color light separation optical system 200 separates the illumination light that exits from the illumination optical system 100 into three color light beams (illumination light beams) having different wavelength bands, respectively. A first dichroic mirror 210 passes a substantially red (R) light beam therethrough, and reflects color light beams that have shorter wavelengths than the wavelength of the transmitted color light beam (that is, a substantially green (G) light beam and a substantially blue (B) light beam). The R light beam that has passed through the first dichroic mirror 210 is reflected by a reflective mirror 230, and passes through a field lens 240 in order to illuminate the R light valve 400R. The field lens 240 converges the plurality of sub-beams from the illumination optical system 100 so that they each illuminate the R light valve 400R. Ordinarily, the sub-beams are each set so that they are substantially parallel to each other. Field lenses 250 and 350 that are provided in front of the other light valves 400G and 400B function similarly.

Of the G light beam and the B light beam reflected by the first dichroic mirror 210, the G light beam is reflected by a second dichroic mirror 220, and passes through a field lens 250 in order to illuminate the G light valve 400G. On the other hand, the B light beam passes through the second dichroic mirror 220, and passes through a relay optical system 300 in order to illuminate the B light valve 400B.

These dichroic mirrors can be produced by forming, on transparent glass plates, dielectric multilayer films corresponding to the functions thereof.

The relay optical system 300 includes a light-incident-side lens 310, a first reflective mirror 320, a relay lens 330, a second reflective mirror 340, and a light-exiting-side lens (field lens) 350. The B light beam that has exited from the color light separation optical system 200 from the illumination optical system 100 converges near the relay lens 330 by the light-incident-side lens 310, and the converged light beam is sent towards the light-exiting-side lens 350. The size of the light beam incident upon the light-exiting-side lens 350 is set so that it is substantially equal to the size of the light beam incident upon the light-incident-side lens 310.

The relay optical system 300 is provided in the B-light path due to the following reason.

That is, the plurality of sub-beams that have exited from the illumination optical system 100 are a divergent bundle of rays. The B-light path is longer than the paths of the other color light beams by an amount corresponding to a path where the relay optical system 300 is disposed. Therefore, when the relay optical system 300 is not provided in the B-light path, the illumination area of the B light valve 400B, that is illuminated with the B light, becomes greater than the illumination areas of the light valves that are illuminated with the other color light beams, so that the B-light illumination efficiency is reduced. In other words, the relay optical system 300 is provided in the B-light path in order to restrict a reduction in the illumination efficiency that is caused by the B-light path being longer that the light paths of the other color light beams.

The illumination area of the B light valve 400B that is illuminated with B light is described in more detail below.

The color light valves 400R, 400G, and 400B convert the color light beams incident thereupon from their corresponding light-incident surfaces into light beams that correspond to respective color signals (pieces of image information), and the converted light beams exit therefrom as transmitted light beams. Transmissive liquid crystal panels are used as such transmissive light valves. These light valves 400R, 400G, and 400B correspond to electro-optical devices used in the present invention.

The cross dichroic prism 500 functions as a color light synthesizing optical system that synthesizes the converted color light beams that exit from the corresponding color light valves 400R, 400G, and 400B, and causes light that represents a color image to exit therefrom. The cross dichroic prism 500 includes an R-light reflective dichroic surface 510R that reflects R light and a B-light reflective dichroic surface 510B that reflects B light. The R-light reflective dichroic surface 510R and the B-light reflective dichroic surface 510B are provided by forming a dielectric multilayer film that reflects R light and a dielectric multilayer film that reflects B light into a substantially X shape arrangement at interfaces of four right-angle prisms. The two dichroic surfaces 510R and 510B synthesize the converted three color light beams in order to produce light that represents a color image. The synthesized light produced by the cross dichroic prism exits therefrom towards the projection lens 600. The projection lens 600 projects the image that is represented by the synthesized light. The projection lens 600 functions as a projection optical system that displays an image. For the color light synthesizing optical system, a cross dichroic mirror may be used instead of the cross dichroic prism.

Figure 2:
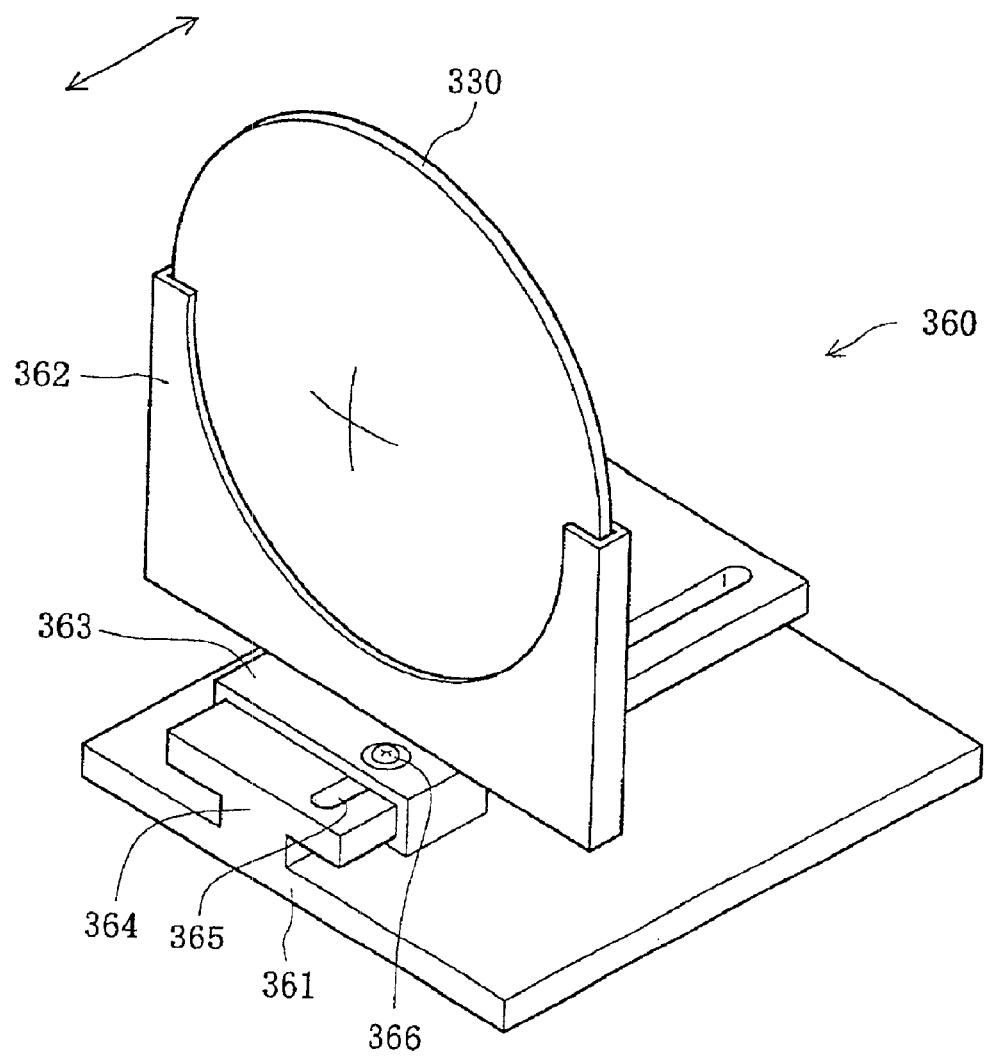
FIG. 2 is an enlarged perspective view of a relay lens 330.

FIG. 2 is an enlarged perspective view of the relay lens 330. The relay lens 330 is mounted to a stage 360. The stage 360 includes a holder 362 that holds the relay lens 330. The holder 362 is secured onto the table 363. The table 363 is provided so as to be movable along a guide rail 364 that is provided on a base 361. A long threaded groove 365 is provided in the guide rail 364 so as to extend along a direction of movement of the table 363. Using a bolt 366, the table 363 can be secured to any location on the guide rail 364 along an optical axis direction. Therefore, the location of the relay lens 330 in the optical axis direction can be adjusted by the stage 360. The stage 360 corresponds to an adjusting device in the present invention.

Figure 3A:
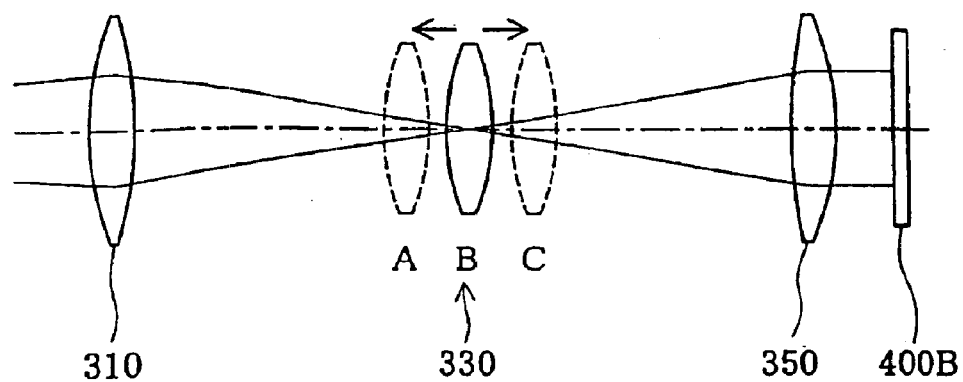
FIGS. 3(A) and 3(B) are schematics that illustrate relationships between locations of the relay lens 330 and illuminating areas of illumination light that illuminates a B light valve 400B.
Figure 3B:
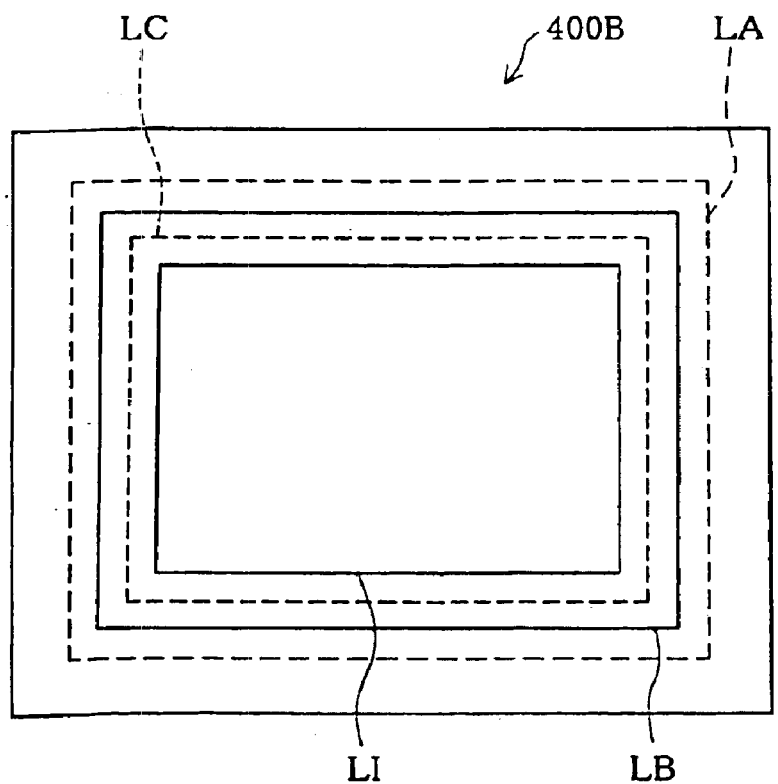

FIGS. 3(A) and 3(B) are schematics that illustrate the relationship between the location of the relay lens 330 and the illumination area of the B light valve 400B that is illuminated with illumination light. FIG. 3(A) illustrates the relay optical system 300 without the two mirrors 320 and 340. FIG. 3(B) illustrates the illuminating area of the illumination light that illuminates a light-incident surface LI of the B light valve 400B. In the case where a location B shown in FIG. 3(A) is used as a reference location of the relay lens 330, when the relay lens 330 is at a location A, as shown in FIG. 3(B), an illumination area LA (area within a long broken line rectangle) that is greater than an illumination area LB (area within a solid line rectangle) at the location B can be provided. When the relay lens 330 is at a location C, an illumination area LC (area within a short broken line rectangle) that is smaller than the illumination area LB at the location B can be provided. In other words, the illumination area can be made large when the relay lens 330 is moved away from the light valve 400B, whereas it can be made small when the relay lens 330 is moved towards the light valve 400B.

The optical characteristics of each of the structural elements of the relay optical system 300 actually vary, so that the illumination efficiency changes due to a large change in the illumination area that is illuminated by the B light and optical loss. However, in the embodiment, since, as described above, the location of the relay lens 330 along the optical axis direction can be adjusted by the stage 360, the size of the B-light illuminating area can be adjusted. Therefore, it is possible to increase the illumination efficiency of the illumination light that illuminates the B light valve 400B.

By positively changing the illumination efficiency of the illumination light, it is also possible to adjust the color intensity of the projected image. In particular, if, as in the present embodiment, the light that passes through the relay optical system 300 is B light, the color intensity is easily adjusted.

Therefore, adjustments for bringing into conformity the illuminating area of B light that passes through the relay optical system 300 and the illuminating areas of the other color illumination light beams can be easily performed.

Although, in the embodiment, the case where the location of the relay lens 330 is adjusted along the optical axis direction is taken as an example, the location of the light-incident-side lens 310 can be adjusted along the optical axis direction. In this case, a change in the light-incident angle of the illumination light that illuminates the B light valve 400B is greater than that when the location of the relay lens 330 is adjusted. A change in the light-incident angle may affect the performances of the other optical systems. For example, a change in the light-incident angle with respect to the light valve may change its light-modulation performance. Therefore, this method is not preferable when the size of the illumination area alone is to be adjusted. Considering this point, it is advantageous to adjust the location of the relay lens 330. Although, in the embodiment, the case where the location of one of the three lenses of the relay optical system 330 is adjusted is taken as an example, the present invention is not limited thereto, so that the location of at least one of the plurality of lenses of the relay optical system can be adjusted in the optical axis direction. Such a modification can be similarly applied in a relay optical system of the following embodiment.

B. Second Embodiment:

FIG. 4 is a schematic plan view of the main portion of optical systems of a projector of a second embodiment of the present invention. A projector PJ2 includes an illumination optical system 100, a color light separation optical system 200A, two relay optical systems 300 and 700, three light valves 400R, 400G, and 400B, a cross dichroic prism 500, and a projection lens 600. Each of the structural elements is disposed in a substantially horizontal direction, with the cross dichroic prism 500 as a center. Of the structural elements, those that correspond to any of the structural elements used in the first embodiment are given the same reference numerals and will not be described below.

The color light separation optical system 200A includes a cross dichroic mirror in which two dichroic mirrors 202 and 204 are disposed in a substantially X-shape arrangement. The first dichroic mirror 202 reflects R light and transmits G light and B light therethrough. The second dichroic mirror 204 reflects B light and transmits G light and R light therethrough. Accordingly, the color light separation optical system 200A separates the illumination light that exits from the illumination optical system 100 into three color light beams, an R beam, a G beam, and a B beam.

The G light beam that has exited from the color light separation optical system 200A passes through the field lens 250 and is incident upon the G light valve 400G. The B light passes through the first relay optical system 300 and illuminates the B light valve 400B. The R light passes through the second relay optical system 700 and illuminates the R light valve 400R.

Similarly to the first relay optical system 300, the second relay optical system 700 includes a light-incident-side lens 710, a first reflective mirror 720, a relay lens 730, a second reflective mirror 740, and a light-exiting-side lens (field lens) 750. The functions of the second relay optical system 700 with respect to R light is similar to the functions of the first relay optical system 300 with respect to B light.

Similarly to the first relay lens 330, the second relay lens 730 is mounted to a stage (not shown) that can adjust the location thereof in an optical axis direction. Therefore, by adjusting the location of the relay lens 730 in the optical axis direction, the size of an illumination area of the R light valve 400R for illumination can be adjusted. This makes it possible to increase the illumination efficiency of the illumination light that illuminates the R light valve 400R.

By positively changing the illumination efficiency of the illumination light, it is possible to adjust the color intensity of a projected image.

As described above, in this embodiment, it is possible to separately adjust the size of the illuminating area of the illumination light that illuminates the R light valve 400R in addition to that of the illumination light that illuminates the B light valve 400B.

Here, the G light valve 400G is previously set with reference to the size of an illuminating area of illumination light that illuminates the G light valve 400G. Here, the illumination areas of the R light valve 400R and the B light valve 400B can be separately adjusted by adjusting the locations of the corresponding relay lenses 730 and 330, so that the sizes of the illumination areas of the corresponding color light valves 400R, 400G, and 400B can be set at corresponding optimal values. This makes it possible to increase the illumination efficiency of the entire projector even more than that in the first embodiment. The range of adjustment of the color intensity can also be increased.

As described above, adjustments for bringing into conformity the illuminating areas of the three color illumination light beams can be even more easily performed in the second embodiment than in the first embodiment.

C. Modifications:

The present invention is not limited to the above-described embodiments and structures, so that it can be performed by various other structures within a range not departing from the scope and intent of the present invention. For example, the following modifications are possible.

(1) In the first embodiment, a device is used to adjust the location of the relay lens 330 that includes the stage 360. However, this device is only provided as an example, and the present invention is not limited thereto. For example, a structure can be used that includes a plurality of slots that dispose the relay lens 330, and that thereby adjusts the location in the optical axis direction by changing the locations of the slots that house the relay lens 330. In other words, any device may be used as long as the location of the relay lens 330 can be adjusted in the optical axis direction. This similarly applies to the stage used to adjust the location of the relay lens 730 used in the second embodiment.

(2) Although, in the first embodiment, the stage 360 that adjusts the location of the relay lens 330 is a device that adjusts the location in the optical axis direction, the present invention is not limited thereto. A three-dimensional stage that can adjust the location in bi-axial directions that are perpendicular to each other and the optical axis may be used. When such a device is used, the location of the illumination area of the light-incident surface of the light valve can be adjusted. This similarly applies to the stage that adjusts the location of the relay lens 730 used in the second embodiment.

(3) Although, in the first embodiment, the color illumination light that passes through the relay optical system 300 is B light is provided as an example, it may be any one of the other color light beams. Although, in the second embodiment, the R light and the B light that pass through the two corresponding relay optical systems 300 and 700 is provided as an example, the present invention is not limited thereto, and that combinations of other colors may be made to pass therethrough.

(4) Although, in each of the embodiments, a projector including three light valves (electro-optical devices) is provided as an example, the present invention may be applied to a projector including two light valves. In other words, the present invention is applicable to a projector including a plurality of light valves.

(5) Although, in each of the above-described embodiments, a projector using transmissive liquid crystal panels as light valves is provided as an example, the present invention is similarly applicable to a projector including reflective liquid crystal panels. The reflective light valves used may be digital micromirror devices (trademark of TI) instead of reflective liquid crystal panels.

What is claimed is:

1. A projector that projects an image, comprising:
   an illumination optical system transmitting illumination light of a plurality of sub light beams;
   a color light separation optical system that separates the illumination light that has exited from the illumination optical system into illumination light beams of a plurality of colors;
   a plurality of electro-optical devices that convert the illumination light beams of a plurality of colors into light beams that correspond to color signals that correspond to the respective illumination light beams of a plurality of colors, each of the illumination light beams of a plurality of colors having a plurality of sub light beams superimposed on the respective electro-optical device;
   a color light synthesizing optical system that synthesizes the converted light beams of a plurality of colors that exit from the plurality of electro-optical devices in order to cause a light beam that represents a color image to exit therefrom;
   a projection optical system that projects the color image that is represented by the synthesized light beam that exits from the color light synthesizing optical system; and
   a relay optical system that is provided in a path of at least one color illumination light beam of the illumination light beams of a plurality of colors that have exited from the color light separation optical system, the relay optical system including three lenses that are aligned along a direction of an optical axis thereof, at least two of the three lenses of the relay optical system being adjustable in an optical axis direction, thereby the color illumination light beam that passes through the respective one of the at least two of the three lenses is independently adjusted among the illumination light beams of a plurality of colors.

2. The projector according to claim 1, the color light separation optical system separating the illumination light that has exited from the illumination optical system into three color illumination light beams, and further including relay optical system provided in corresponding paths of two of the three color illumination light beams that have exited from the color light separation optical system, each relay optical system including three lenses that are aligned along a direction of an optical axis thereof and an adjusting device that adjusts the location of at least one the three lenses of the corresponding relay optical system in an optical axis direction.

3. The projector according to claim 2, at least one of the lenses being a relay lens.

4. The projector according to claim 2, the adjusting devices being capable of adjusting the locations in biaxial directions that are perpendicular to each other and the corresponding optical axis direction.

5. The projector according to claim 2, wherein the adjusting device comprises:
   a holder that holds the relay lens;
   a table that secures the holder; and a guide that enables the table to move along the optical axis direction.

6. The projector according to claim 1, at least one of the lenses being a relay lens with an adjusting device.

7. The projector according to claim 6, the adjusting device being capable of adjusting the location in biaxial directions that are perpendicular to each other and the corresponding optical axis direction.

8. The projector according to claim 6, wherein the adjusting device comprises:
a holder that holds the relay lens;
a table that secures the holder; and
a guide that enables the table to move along the optical axis direction.

* * * * *